United States Patent
Gelbke et al.

(10) Patent No.: US 11,243,516 B2
(45) Date of Patent: Feb. 8, 2022

(54) EDGE DEVICES AND ASSOCIATED NETWORKS UTILISING MICROSERVICES

(71) Applicant: Siemens Aktiengesellschaft, Munich (DE)

(72) Inventors: Lars Gelbke, Mansfeld (DE); Fei Li, Vienna (AT)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 58 days.

(21) Appl. No.: 16/633,700

(22) PCT Filed: Jul. 20, 2018

(86) PCT No.: PCT/EP2018/069779
§ 371 (c)(1),
(2) Date: Jan. 24, 2020

(87) PCT Pub. No.: WO2019/020514
PCT Pub. Date: Jan. 31, 2019

(65) Prior Publication Data
US 2020/0233403 A1    Jul. 23, 2020

(30) Foreign Application Priority Data

Jul. 28, 2017 (EP) .................................. 17183744

(51) Int. Cl.
*G05B 19/418* (2006.01)
*G06F 8/65* (2018.01)
*H04L 29/08* (2006.01)

(52) U.S. Cl.
CPC ..... *G05B 19/4185* (2013.01); *G05B 19/4183* (2013.01); *G06F 8/65* (2013.01); *H04L 67/16* (2013.01)

(58) Field of Classification Search
CPC ... G05B 19/4185; G05B 19/4183; G06F 8/65; G06F 8/60; H04L 67/16; H04L 67/12; H04L 67/10
See application file for complete search history.

(56) References Cited

U.S. PATENT DOCUMENTS 10,055,200 B1 *  8/2018  Russell ............... G06F 11/3696
10,334,029 B2 *  6/2019  Agrawal ................. H04L 67/10
(Continued)

FOREIGN PATENT DOCUMENTS

EP    2916228 A1    9/2015    ............... G06F 11/14
WO    2019/020514 A1    1/2019    ............... G06F 8/60

OTHER PUBLICATIONS

Nastic, Stefan et al., "A Middleware Infrastructure for Utility-based Provisioning of IoT Cloud Systems," 2016 IEEE/ACM Symposium on Edge Computing (SEC), IEEE, pp. 28-40.
(Continued)

*Primary Examiner* — Javier O Guzman
(74) *Attorney, Agent, or Firm* — Slayden Grubert Beard PLLC

(57) ABSTRACT

Various embodiments include an edge device for a network comprising: a connection for one or more production devices; and a processor adapted to run a plurality of microservices each comprising an artifact adapted for accessing an analytics database. The analytics database is shared between microservices. The edge device is adapted to access measurement information pertaining to the one or more production devices. The measurement information is stored in a measurement database that is separate from the analytics database.

14 Claims, 7 Drawing Sheets

(56) References Cited

U.S. PATENT DOCUMENTS

| | | | |
|---|---|---|---|
| 2016/0378449 A1 | 12/2016 | Khazanchi et al. | 717/120 |
| 2017/0046146 A1* | 2/2017 | Jamjoom | G06F 8/71 |
| 2017/0060574 A1* | 3/2017 | Malladi | G06F 9/542 |
| 2018/0068004 A1* | 3/2018 | Lavasani | G06F 16/2379 |
| 2018/0069925 A1* | 3/2018 | Lavasani | G06F 16/2379 |
| 2018/0159747 A1* | 6/2018 | Chang | H04L 41/5045 |
| 2018/0300124 A1* | 10/2018 | Malladi | H04L 12/2823 |
| 2018/0309637 A1* | 10/2018 | Gill | H04L 41/12 |

OTHER PUBLICATIONS

Vandikas, Konstantinos et al., "Microservices in IoT clouds", 2016 Cloudification of the Internet of Things (CIOT), IEEE, pp. 1-6, pp. 1, col. 1, line 13-pp. 1, col. 2, line 48; figure 1, p. 2, col. 4-p. 3, col. 6.

International Search Report and Written Opinion, Application No. PCT/EP2018/069779, 13 pages, dated Nov. 2, 2018.

European Office Action, Application No. 18746657.8, 8 pages, dated Jul. 9, 2021.

* cited by examiner

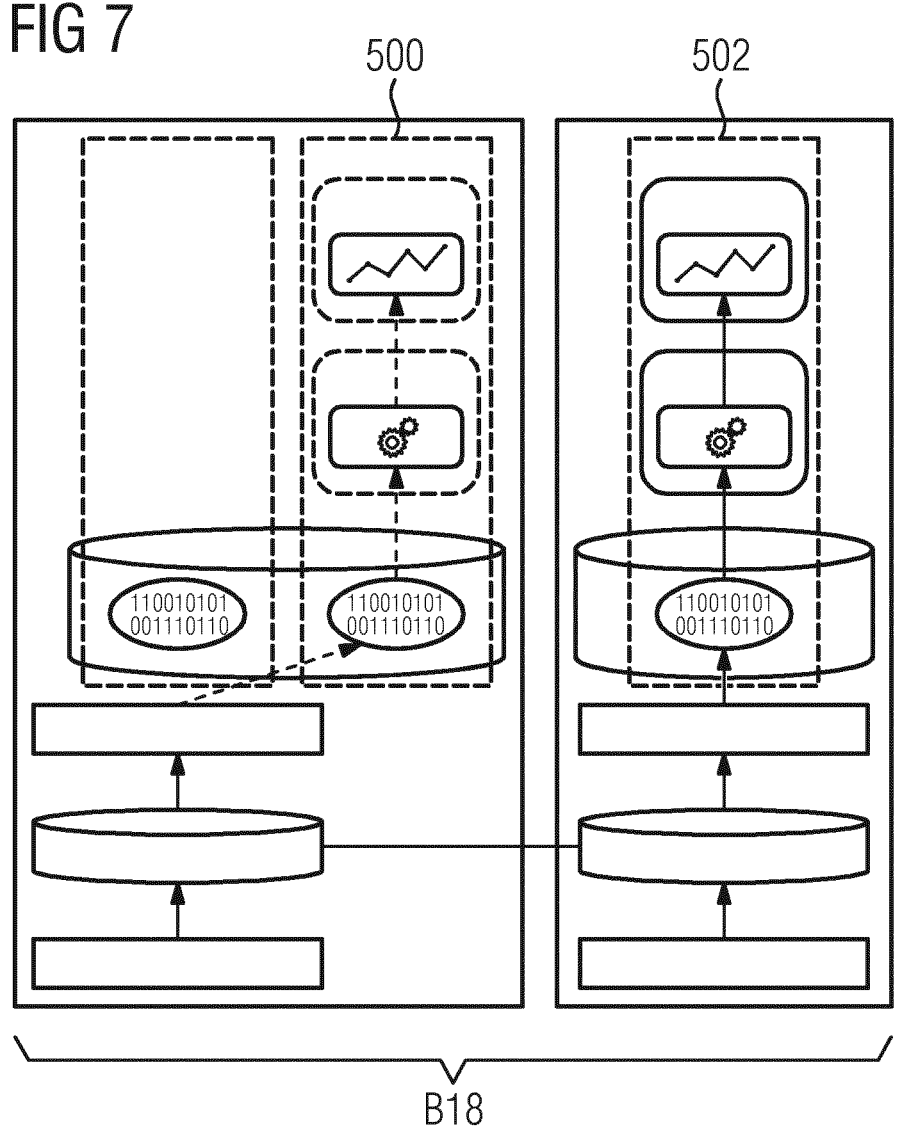

EDGE DEVICES AND ASSOCIATED NETWORKS UTILISING MICROSERVICES

CROSS-REFERENCE TO RELATED APPLICATIONS

This application is a U.S. National Stage Application of International Application No. PCT/EP2018/069779 filed Jul. 20, 2018, which designates the United States of America, and claims priority to DE Application No. 17183744.6 filed Jul. 28, 2017, the contents of which are hereby incorporated by reference in their entirety.

TECHNICAL FIELD

The present disclosure relates to networks. Various embodiments include edge devices and associated networks utilizing microservices.

BACKGROUND

Digitalization poses significant challenges to the practices of industrial software development and delivery. Production in rapidly digitalizing industries calls for flexible configurations, customizable features, frequent changes, and above all, short time to market. However, under strict regulations and non-negotiable requirements on safety, reliability and compliance, industrial software is still dominated by monolithic architecture that usually requires planned downtime and manual installation for each update. The result is a typical release cycle of 12-18 months with several patches during the release cycle.

SUMMARY

The teachings of the present disclosure facilitate acceleration of software delivery to edge devices in particular by applying microservice architecture with continuous deployment. For example, some embodiments include an edge device for a network, the edge device being connected or connectable to one or more production devices. The edge device is adapted to run a plurality of microservices, each microservice comprising an artifact adapted for accessing an analytics database, wherein the analytics database is shared between microservices. Further, the edge device is adapted to access measurement information pertaining to the one or more production devices, wherein the measurement information is stored in a measurement database that is separate from the analytics database. The measurement database may be implemented on the edge device, or in a core network. Using microservices with a shared database facilitates improved updates and service delivery. The network may be a core network, and/or may comprise one or more delivery pipelines. Each microservice may pertain to a production device. Different microservice may pertain to different production devices and/or different functionality and/or different parameters to be determined, e.g. for analytics.

As another example, some embodiments include a method of operating an edge device as disclosed herein, which comprise actions performing the functionality associated with the edge device.

BRIEF DESCRIPTION OF THE DRAWINGS

The properties, features, and advantages of various embodiments of the present disclosure as well as the way they may be achieved will be made clearer and better understandable in the light of the following discussion, making reference to exemplary embodiments shown in accompanying figures, in which:

FIG. 7 shows an example microservice.

DETAILED DESCRIPTION

Figure 1:
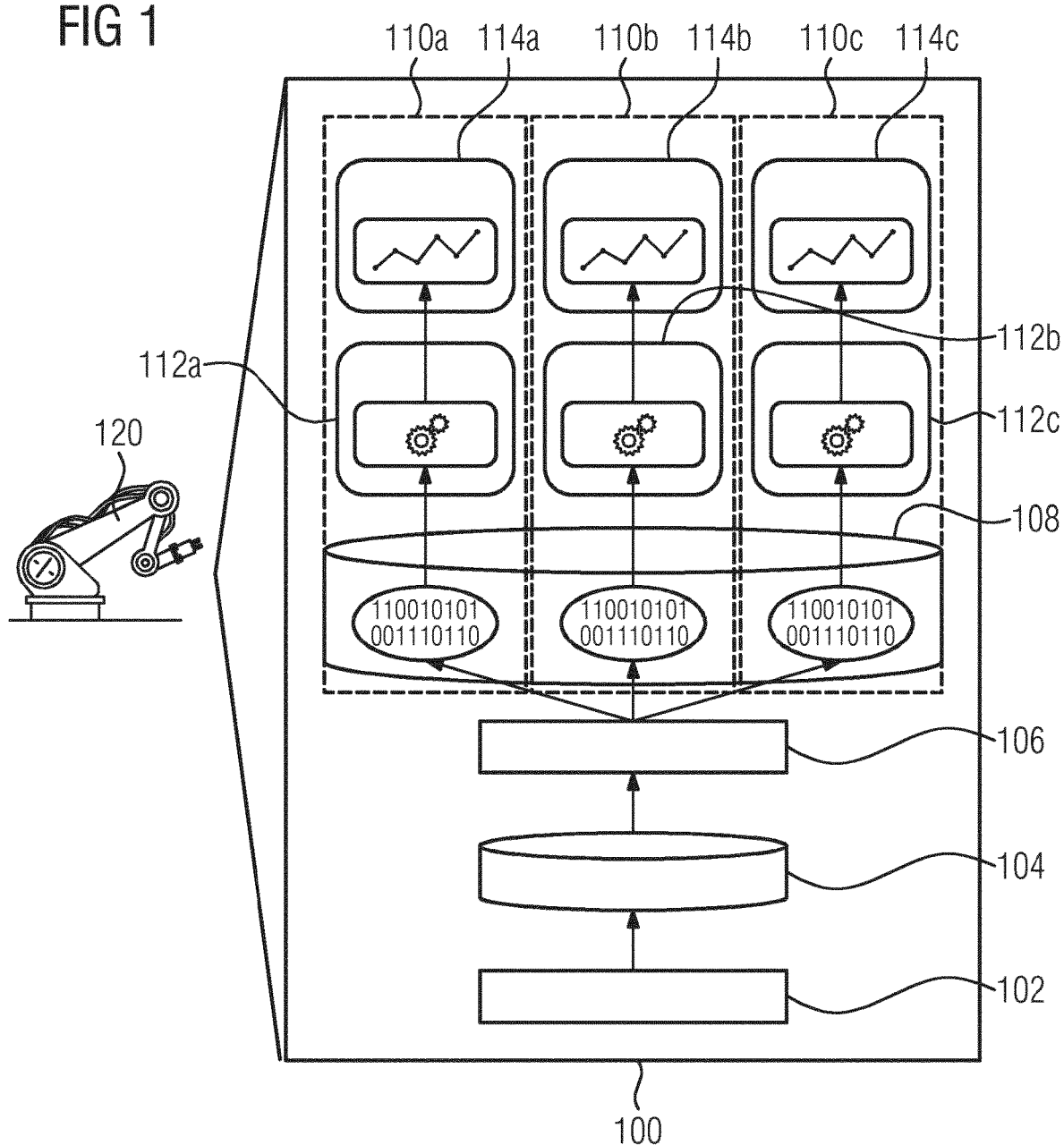
FIG. 1 shows an exemplary edge device incorporating teachings of the present disclosure.

In general, an analytics database may be stored in an edge device, e.g. in a memory thereof. The memory may be arranged in a housing of the edge device. An analytics database may store data provided by one or more artifacts and/or microservices, e.g. analytics artifacts. The data may represent KPI and/or one or more operational parameters determined based on measurement information. In some embodiments, the data may represent control information provided to the production device, and/or responses from the production device/s.

In some embodiments, an artifact provides a Key Performance Indicator (KPI) associated to one of the production devices. In particular, an artifact may provide one and/or a single KPI or associated parameter. Thus, each module may be a particularly simple microservice.

In some embodiments, the edge device and/or a production device may be connected or connectable to a second edge device, wherein the second edge device may be a standby device. The production device may be connected to the edge device. The edge device and second edge device may be considered to represent an edge device system, and/or an edge device pair, which may be connected to one or more production devices, in particular in a way that both edge devices are connected to the same production devices.

In some embodiments, the edge device may receive, and/or be adapted to receive, an update for a microservice, and run and/or be adapted to run the update of the microservice in parallel to the microservice to be updated. Accordingly, it is not necessary to stop operation to update a microservice.

In some embodiments, the edge device may run, and/or be adapted to run, the microservice to be updated, and the update for the microservice may be run on a second edge device. The second edge device may be started from a standby mode for running the update. The edge device may be adapted to start the second edge device. In some embodiments, a core network and/or an associated pipeline may be adapted for starting the second edge device. In a standby mode, microservices and/or artifacts may be deployed, but not executed by the standby device.

In some embodiments, the edge device may run, and/or be adapted to run, the microservice to be updated and the update for the microservice in parallel. Parallel running of the update and the old version of a microservice allows monitoring of the update's behaviour before stopping the old version, the version to be updated. Updates of microservices may be represented by updates to one or more artifacts of the microservice. Updates may pertain to the same production device as the microservices or artifacts to be updated, and/or may provide the same or analogous functionality.

In some embodiments, the edge device may be connected or connectable to a core network for receiving updates of microservices and/or accessing the measurement information. Such microservices may be provided by a core network. In particular, the measurement database may be located in the core network. In general, an edge device may comprise one or more connections and/or interfaces to connect to one or more product devices and/or the core network and/or a second edge device. A connection may comprise one or more interfaces, which may be communication interfaces. A communication interface may be wireless, or cabled, e.g. utilising a wire and/or optical fiber. In some embodiments, a product device may comprise a corresponding connection and/or interface, and/or the core network and/or second edge device may comprise a corresponding connection.

In some embodiments, the core network comprises a plurality of pipelines, each pipeline pertaining to a different microservice and/or different module of a microservice. A pipeline generally may be represented by, and/or comprise a plurality of devices and/or tools, e.g. software tools, to provide services for developing and/or delivering an update of a microservice, and/or one or more modules associated to a microservice. The devices and/or tools of a pipeline may be connected by communication interfaces. In some cases, devices and/or tools of a pipeline may be connected serially. Different pipelines may be arranged to be parallel to each other, e.g. such that microservices and/or artifacts and/or modules may be managed in parallel. Examples of devices or tools may comprise a computer like a server or workstation, user interface, development environment, compiler, editor, test environment, etc. Devices and/or tools may be in a container, e.g. in a separate programming environment and/or virtualized system.

In some embodiments, each pipeline, in particular each delivery pipeline, may comprise, and/or be associated to, a plurality of stages, wherein one of the plurality of stages may provide an environment architecture, the environment architecture being adapted to a production architecture. A stage may comprise one or more devices and/or tools. It may be considered that a stage is provided in a container, which may e.g. comprise the associated devices and tools. A device may in general be implemented in software and/or hardware and/or firmware. In some embodiments, a device is virtualized, e.g. simulated in software. A tool may for example be implemented in software. A production architecture may represent the conditions and/or environment of operation of one or more production devices, in particular regarding physical parameters, and/or neighboring and/or connected devices and/or communication, and/or in terms of tasks to be performed, power supply, and/or control, and/or physical parameters of the surroundings. An environment architecture may represent the production architecture, e.g. parametrize and/or simulate in part or whole the production architecture.

In some embodiments, each pipeline may comprise a plurality of stages, wherein at least one of the stages may be provided in a container. Such pipelines and stages facilitate efficient handling of the development environment for microservices, in particular efficient adapting to changes. In some embodiments, the edge device may run, and/or be adapted for running, different microservices and/or different modules of microservice in different run-time environments and/or sandboxes and/or virtualized devices.

There may be considered a core network connected or connectable to one or more edge devices. An edge device may be an edge device as described herein. The core network comprises a plurality of pipelines, each pipeline pertaining to a different microservice and/or different module of a microservice. A module of a microservice may be an artifact, or a stage or container of the pipeline associated to the microservice.

In some embodiments, each pipeline may comprise a plurality of stages, wherein one of the plurality of stages provides an environment architecture, the environment architecture being adapted to a production architecture.

An edge device may comprise a hardware device that may run the edge of a network. An edge device may be connected to one or more production devices, e.g. industrial equipment. It may be considered that an edge device is in close physical proximity to production device/s and/or industrial equipment. It may have limited computational resources, and/or may have the capability of running real-time or near real-time control and data acquisition software, e.g. in an artifact.

In some embodiments, an edge device may be implemented in hardware and/or software and/or firmware, e.g. formulated as a computer program product with instructions causing processing circuitry to carry out and/or control the functionality of the edge device. The above described edge device and/or core network may comprise a computer system. A method comprising the functional actions any of the devices or systems or networks described herein is adapted for may be considered, as well as a computer program comprising instructions causing a computer and/or processing circuitry to carry out and/or control a corresponding method.

In some embodiments, a storage medium stores such a program. In some embodiments, a device or software or tool comprises individual modules or subsystems for representing individual functionality. A module generally may be implemented in software. In some embodiments, a device, in particular an edge device, and/or production device, and/or device or the core network, comprises and/or utilises integrated circuitry, in particular processing circuitry, for providing the functionalities.

Integrated circuitry or processing circuitry may comprise one or more processors, e.g. microprocessor/s, and/or FPGAs (Field Programmable Gate Array) and/or ASICs (Application Specific Integrated Circuitry) and/or microcontrollers. The circuitry may comprise, and/or be connected or connectable to, memory, e.g. non-transitory and/or volatile and/or non-volatile memory. Examples of memory and/or a storage medium may comprise RAM (Random Access Memory), ROM (Read-Only Memory), cache memory, buffer memory, optical memory or magnetic memory, and/or a non-transistory memory or storage medium. A device or network may be centralised or distributed, e.g. with different functionalities associated to different modules or units, e.g. communicating via suitable interfaces like communication interfaces and/or software interfaces.

Examples of edge devices comprise a router, linking device, computer, and/or switch. An edge device may be adapted to interface and/or translate between different protocols associated to communication interfaces. It may be considered that an edge device is connected or connectable to a production device with a different interface than to a core network and/or second edge device.

An artifact may be implemented in software, e.g. a binary program and/or script. In some embodiments, an artifact may be executed or run independently, although it may have software interfaces to one or more other artifacts and/or modules, and/or may access information from one or more other modules and/or artifacts. An artifact may have control functionality for controlling e.g. an edge interface.

In some embodiments, an artifact may have analytics functionality, e.g. for analyzing the behaviour and/or condition of a production device. Each artifact may be associated and/or pertain to one specific production device, e.g. for analyzing or controlling or monitoring. In some embodiments, different artifacts are associated to different production devices, and/or have different functionality. In some cases, an artifact may be an update of another artifact, the artifact to be updated also, e.g. with improved functionality and/or reliability and/or with bug fixes. A microservice may comprise an artifact adapted to receive input information, and/or to access information, e.g. from another artifact and/or a database and/or a production device, and/or to access the shared database and/or the measurement database.

The artifact may be adapted to provide output information based on processing performed by the artifact, e.g. based on input information. Accessing a database may in general comprise retrieving and/or reading information from the database, e.g. input information, and/or to provide and/or write information to the database, e.g. output information. A microservice may be represented by one or more artifacts, e.g. an artifact accessing one or more databases and/or a user interface. The artifact may have its own user interface to access or may be linked to a user interface running separately, e.g. a graphical user interface. A user interface may comprise and/or be connected or connectable to input and/or output devices, e.g. a display or screen or touchscreen. More than one artifact may be associated to the same user interface. Running a software or artifact may comprise executing instructions or code representing and/or comprising the artifact, e.g. on processing circuitry.

A core network may comprise one or more devices, at least one of which may be connected or connectable to an edge device, e.g. via a communication interface. The core network may in particular be a network adapted for receiving and/or storing measurement information, which may be provided and/or routed via an edge device. Measurement information may generally represent physical parameters or values or changes thereof of one or more production devices. An artifact associated to a production device may retrieve and/or provide measurement information pertaining to the associated production device, and/or process such, e.g. perform analysis and/or calculations thereon. A core network may be a network adapted to deliver new artifacts and/or updated artifacts to the edge device. In general, a core network may be connected or connectable to one or more edge device, e.g. such that different pipelines are connected to different edge devices. A pipeline may be implemented in, or as a part of, a core network. The core network may comprise a plurality of pipelines, in particular delivery pipelines.

An example method may especially be carried out, completely or in part, by a computer system. To these ends, the method may be formulated as a computer program product with program code and/or instructions. The above described system may comprise the computer system. Advantages or features of the method may apply to the method and vice versa.

In some embodiments, a service delivery approach is based on three approaches and may be implemented separately or in combination. First, a microservice architecture that decouples components into independently deployable services is suggested. Second, a build pipeline that generates the artifacts that can be instantiated as services at runtime is described. Third, a method to deploy services onto edge devices while ensuring availability during deployment is discussed. In some embodiments, there is a microservice architecture with shared database on a device like an edge device. The shared database may generally be shared by microservices on the device, and/or between devices.

The typical software on edge devices in industrial environments can collect measurement data from equipment like production devices and execute control commands. Exemplary software is known as the Supervisory Control and Data Acquisition (SCADA). A KPI (Key Performance Indicator) analytics application in a SCADA system may be seen as an example to demonstrate the architectural concept and delivery method. The KPI application analyzes the measurement data according to user specified KPI targets, for example, productivity, energy consumption and so on. It may be triggered periodically or by abnormal measurements.

FIG. 1 shows an exemplary edge device 100 connected to a production device 120, or to a plurality of production devices. On the edge device 100, drivers 102 providing a driver layer and associated functionality may be implemented, as well as a measurement layer 104, which may implement measurements associated to the production devices 120, and/or receive associated measurement information or results. Such measurement information may be stored in a measurement database, which may be implemented on the edge device 100, e.g. in layer 104, or separate thereof.

A trigger layer or module 106 may provide event triggers, e.g. to perform measurements and/or analytics based on measurements. Triggering may occur event driven, or periodically, or according to a time schedule, or a combination thereof. In the example, three different microservices 110a, 110b, 110c are shown for illustration. Each microservice 110a, 110b, 110c may represent a different KPI application, e.g. performing calculation and/or analytics associated to a different KPI parameter. The microservices may be designed to comprise and/or be associated to three types of artifacts, namely a data model 108, business or analytics logic, which may be represented by analytic artifacts 112a, 112b, 112c, and visualization and/or representation, e.g. UI or panels 114a, 114b, 114c.

The data model 108 may be implemented in a shared database. Database entities may be created through scripts. The analytics logics 112a, 112b, 112c may be implemented as scripts that may invoke other mathematical or analytics libraries to calculate KPIs. The panels 114a, 114b, 114c may visualize the KPIs for operators of equipment. The database 108 for analytics may be separated from the core database to store measurement data, which has higher availability requirements and may be certified under industrial regulations.

In contrast with a monolithic architecture, where the runtime processes are divided by function-UI, scripts, and database, the proposed architecture allows KPI applications to run on edge devices without interfering with other applications or the core functions of the edge devices. As noted, the KPI database 108 is separated from the measurement database, and is shared between KPI services 110a, 110b, 110c. In particular, artifacts like the analytics artifact 112a, 112b, 112c may share the database 108, and/or the measurement database, e.g. may be adapted to independently access the database/s. In some embodiments, there is a delivery pipeline, which may be connected to one or more edge devices.

Microservice architecture structures an application, e.g. software, as collection of loosely coupled microservices, which may be somewhat, but not necessarily totally, independent services; for example, they may exchange data via suitable connections or interfaces. Microservices are easier and faster to develop based on the lower complexity of each service compared to more monolithic services, in which e.g. one large software module may implement multiple functionalities and/or services. This allows much faster release cycles and adaption to customer needs. On the other hand, the composition of all these services may still be perceived as one application. The complexity of orchestrating microservices may be larger than for a single application. In particular, a complexity shift from the design and development part into the environment—build, test, deploy—may occur.

If it comes to the build and release process, the used delivery pipeline may be adapted to support the microservices architecture. Based on the increased orchestration complexity and the separation into partially independent services, no out-of-the-box delivery pipeline will "just" fit to the application needs. Instead, the delivery pipeline is an on-going (incremental and iterative) structure which may permanently align to the product architecture, e.g. be adapted constantly to changes of the product architecture, e.g. operation conditions or new technology. This constant alignment may be subject to the same quality constraints as the product itself. Each part and each change of the delivery pipeline may be subjected to source-management, quality checks and finally deployment. Further, even for the pipeline itself, modern technologies like containerization and/or cloudification may be used. Modern development environments/delivery pipelines may become as important as the product and may be considered to be a major part of the product.

Figure 2:
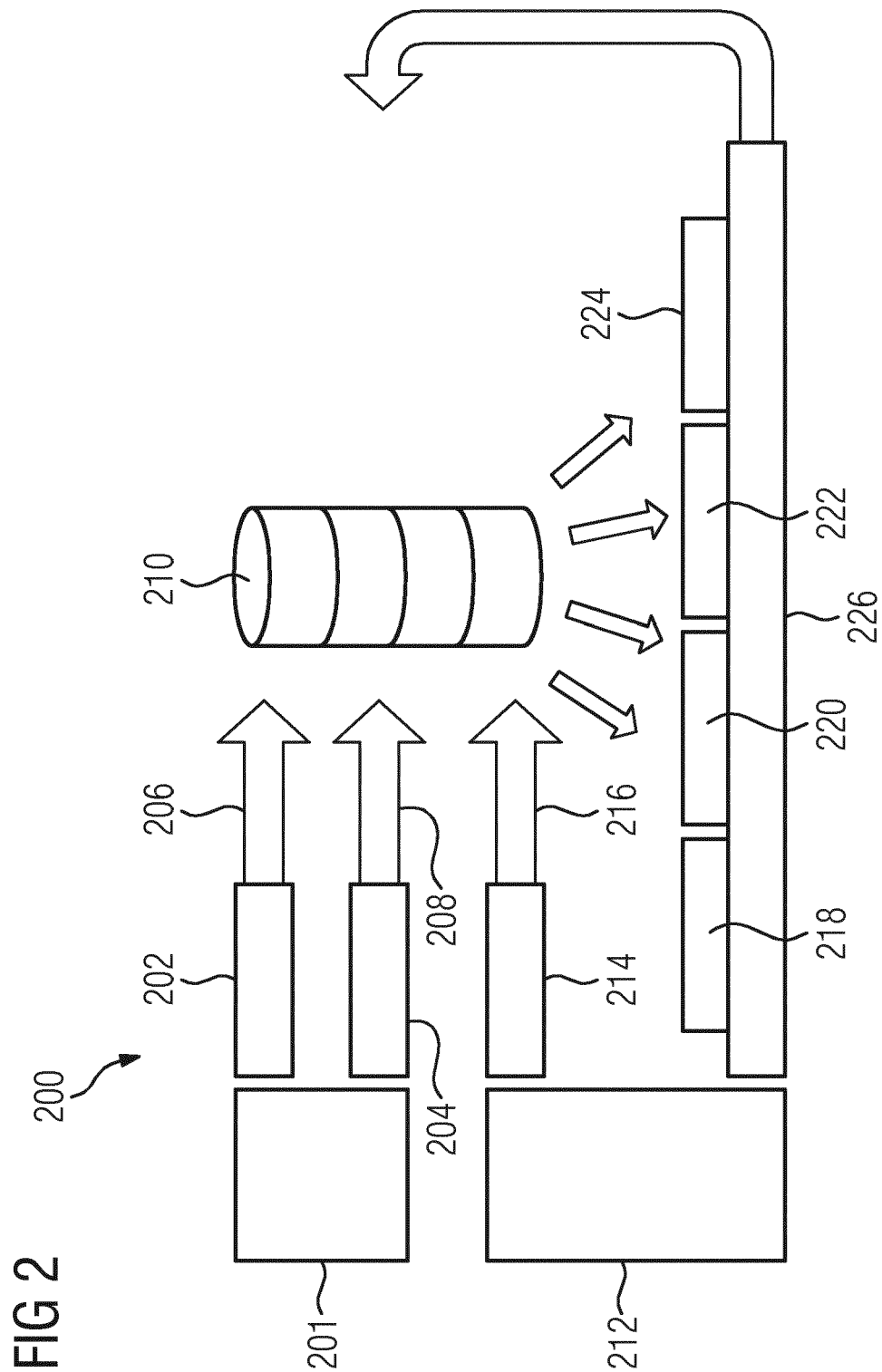
FIG. 2 shows exemplary stages and pipelines incorporating teachings of the present disclosure.

In some embodiments, there is a pipeline setup 200, as shown exemplarily in FIG. 2. The pipeline 226 may be a delivery pipeline associated to one microservice. For an environment stage 201, a build pipeline 202 may be considered, which may provide a build-server container 206, which may comprise software and/or tools for building a microservice, e.g. scripts and/or compiler and/or interpreter and/or associated libraries and/or a programming environment and/or tools. Also, a test tooling pipeline 204 may provide a test tooling container 208, which may comprise test tools for checking or testing a build of a microservice or artifact.

A development stage 212 may comprise a test creation pipeline 214, which may provide a container with test 216. The containers 206, 208 and 216 may be stored in a container repository 210, which may be referred to as binary repository. The repository 210 may be implemented as a storage or memory, and/or a database. The delivery pipeline 226 may represent a delivery stage, which may access the repository 210 to access containers for stages of checking 218, building 220, deploying 222 and/or testing 224 for a microservice or an artifact associated to the pipeline 226. The stages 201, 212 may be considered stages of the pipeline associated to the microservice or artifact that is developed using the pipeline 226. The pipelines 202, 204, 214 may be considered pipelines that are part of, and/or associated to, delivery pipeline 226.

Pipeline 226 may deliver a product like an artifact, e.g. to an edge device, and may be considered a delivery pipeline. A delivery pipeline may be associated to one artifact and/or microservice, e.g. for new development and/or for updating. Checking may comprise checking retrieved containers for fulfillment of requirements, e.g. in regards to capabilities and/or software dependencies, pertaining to building an artifact. Deploying may refer to providing an executable product like a software to another stage or container or pipeline or device, for example for testing. Testing may comprise individually testing and/or integration testing. Building an artifact or microservice may comprise compiling and/or constructing a script.

Constant or on-going alignment or adaption of the delivery pipeline may be improved with close communication between the product, test and environment architectures or stages. A responsibility shift regarding the implementation of the required environment changes may be indicated. Purely centralized and project independent departments won't be able to handle all changes and cannot provide a specifically tailored pipeline. Instead, a separation into several stages is suggested, e.g. as described above. Central departments providing a set of common services to project teams may be implemented. These services are well known and may comprise common tools like build servers, task management systems and/or accessibility to cloud environments.

On one of the stages, e.g. the second stage, an environment architect may start to create a proper environment architecture which fulfill the product needs. This environment architecture ensures that the pipeline is aligned to the product architecture by e.g. supporting several pipelines for each microservice, accessibility to proper test runtime for parallel testing, and/or integration of development workspaces into the delivery pipeline. An environment team may start the implementation of this environment architecture mainly (but not necessary only) based on the services provided by a central department. The result should be a first minimal viable delivery pipeline plus templates which can be used by the development teams to leverage on the delivery pipeline. A third and final stage may be related to development teams.

Development teams may use the templates and patterns to integrate product code into the project delivery pipeline. They may adjust and/or extent the pipeline for further alignment to the specific needs. For example, some microservices may need more integration testing than other. In such a case, the responsible development team can extent the pipeline for this microservice and they are responsible for the correct execution.

A central IT department may be responsible for basic services and focusing on IT related topics, e.g. secure server/tool installation, secure connectivity, licensing. It may provide state-of-the-art tools and technologies. A project environment team may create and implement a product architecture fitting environment architecture. Further, this team may provide templates and patterns to the development team and may be responsible for the correct project infrastructure (e.g. correct configuration and integration of build servers and test environments). One or more development teams may leverage on the provided project infrastructure and templates, but may be responsible for correct execution from commit to deploy.

Each team may utilise an associated stage or pipeline associated to a delivery pipeline. Delivery pipelines may constantly evolve correspondingly to the product, e.g. a microservice or artifact. Basically, an incremental and iterative approach may be used to stay aligned to the product, and to stay up-to-date in terms of used technologies. Such a "on-going" changing structure may be managed in the same ways as "normal" product code. For example, each part of the delivery pipeline, e.g. used tools, configurations, toolsintegrations, server instances, templates, clue-code, etc., may be source-managed, quality checked, tested and finally deployed to the project infrastructure. The delivery pipeline may "not just" be for the product code, but also for the infrastructure itself. Thus, each provided part, like a stage or container, may pass the delivery pipeline in order to reach product quality. Thus, it is suggested to update a pipeline like a delivery pipeline corresponding to updates for a product like an artifact or microservice.

Pipeline technologies to provide high quality product level delivery pipelines may be used, and/or may be updated. The approaches described herein facilitate easy update of pipelines associated to artifact or microservice updates due to the staged and/or container-based approach. Similar to the microservices architecture, the delivery pipeline itself may be seen as a composition of several smaller parts/services. Each of this parts/services may be produced in a separated pipeline and/or stage. To enable a proper testing and finally deploy or deliver or provide the product, technologies like containerization and/or virtualization may be used. For example, each part of the pipeline may be available as a container, facilitating easy deployment to server instances in order to do their task.

One concrete example could be the test execution during the product creation. Several containers may be created before the "Product-Creation Pipelines" or delivery pipeline 226 is executed the first time, and stored in a repository 210, as indicated in FIG. 2. The "Build-Agent Pipeline" or build pipeline 201 may create a container 206 including all configurations and binaries required for product code compilation. During the execution of the "Product-Creation Pipeline" 226, this container (Build-Agent-Container) 206 can be used for compilation of the product source code. An analogous approach may be implemented for testing. For example, the required test tools may be provided via a pre-created container 208, as may be the tests 216.

Leveraging modern technologies like containerization and/or cloudification enables flexible and stable delivery pipelines. Each part of the delivery pipeline can provides as separated well tested artifact/container. Pipeline stages may be used. One of the challenges of microservice architectures is the orchestration of these microservices. The core aspect of this architecture is the separation into smaller, better manageable parts. This may be supported by the pipeline arrangement.

Figure 3:
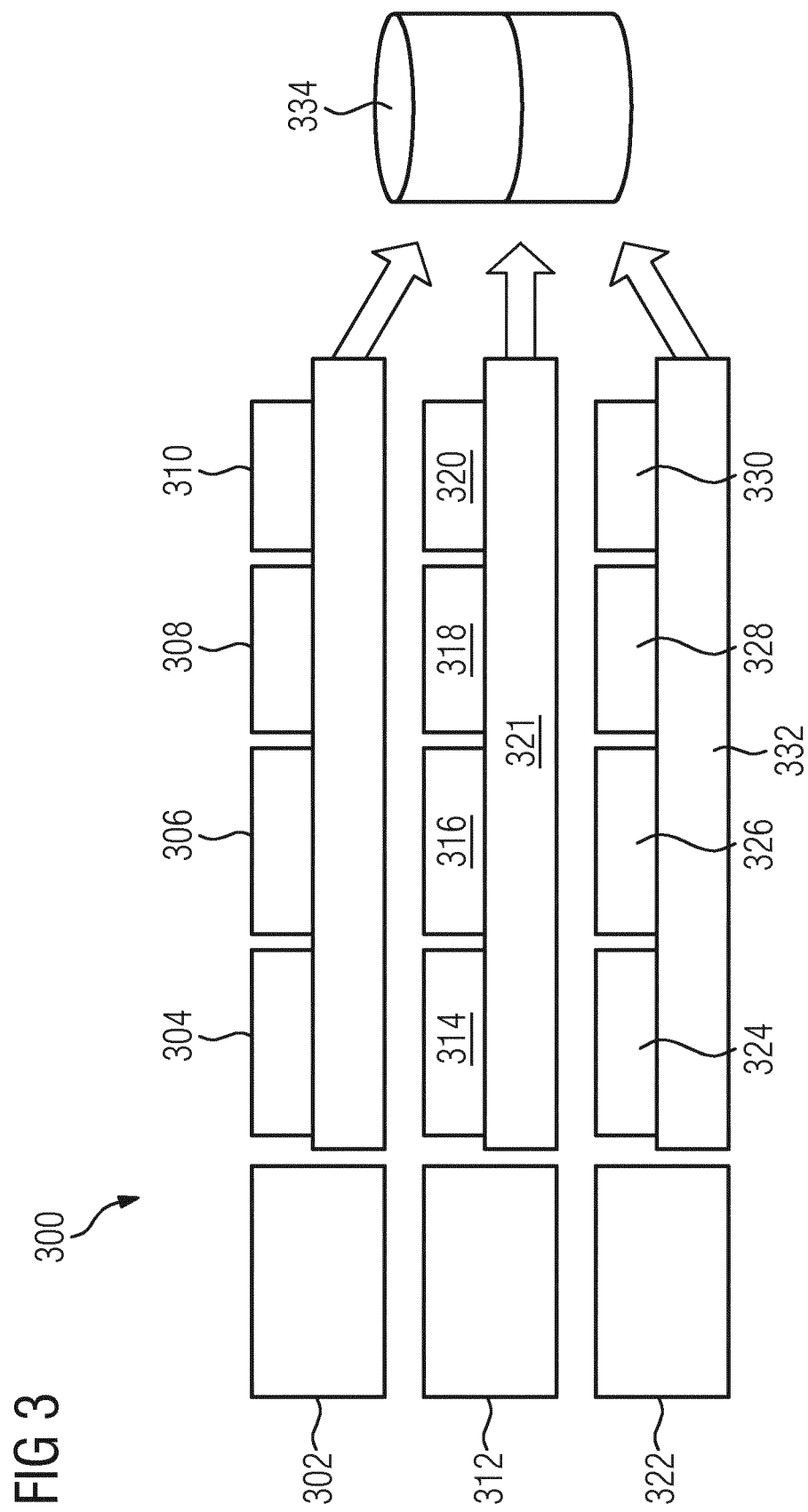
FIG. 3 shows exemplary pipelines for multiple microservices.

As shown in FIG. 3, for microservice pipelines 300, each microservice 302, 312, 322 may have its own delivery pipeline 311, 321, 332 that produces already well tested artifacts. Each delivery pipeline may have associated pipelines and/or containers for checking 304, 314, 324 building 306, 316, 326, deploying 308, 318, 328 and/or testing 310, 320, 330, which may be provided based on associated stages and/or pipelines for developing the delivery pipeline. Each delivery pipeline 311, 321, 332 may provide an artifact for an associated microservice to an artifact storage or database 334, which may be referred to as an artifactory. The artifactory 334 may be considered staged.

Artifacts may be now be flagged/staged as ready for integration test. In the next stage, integration testing using the latest stable versions of the "not to test" micoservices and the just created version of the "to-test" microservice may be performed. For example, if a new version of microservice 302 or "MS-1" is available the integration test will use "latest stable" version of microservices 312 "MS-2" and 322 "MS-3" and the newly generated version of "MS-1". If this integration test is passed without any error, the tested microservice gets promoted into the "latest stable" stage.

The integration pipeline may be provided after the delivery pipelines and/or be considered to represent an integration testing stage, which may be based on, and/or associated to a plurality of artifacts and/or microservices, e.g. such microservices that communicate with each other and/or have inter-dependencies.

This staging concept can repeated as often as necessary. For example, if the composition of microservices 1, 2 and 3 is a subsystem of the full application of microservices, this subsystem may be tested against one or more other subsystems. Only if the full staging chain passes without errors the, an initially build microservice or artifact gets promoted to "latest-stable". At this stage, it is possible to perform additional manual certification on the artifacts by internal or external partners before being released for deployment on, or delivery to, one or more edge devices.

When artifacts are ready for deployment, devices themselves will decide when it is the appropriate time to perform and update. A possible minimal requirement may be that the KPI application to be updated is not performing KPI analysis, e.g. as expected. Different approaches for microservice or artifact deployment in production may be considered.

According to the example configurations of edge devices, two types of deployment variants are described. In some embodiments, update of a microservice or artifact on the same device may assume that there is only one device without backup. Update with standby device assumes that a standby device is running in parallel with the main device. Both variants are demonstrated through the KPI application. An update may be a product delivered to an edge device based on pipelines as described herein.

Figure 4:
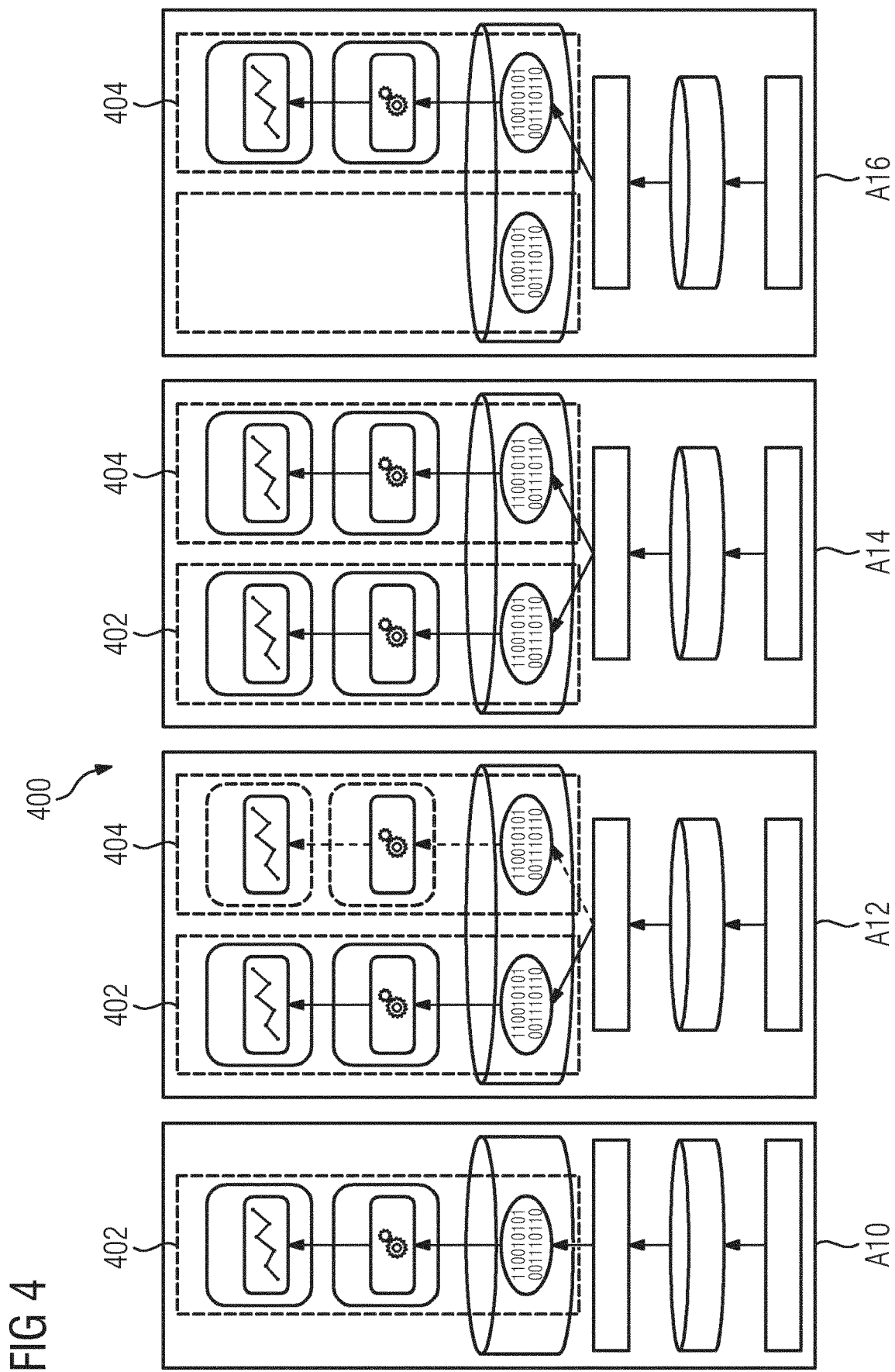
FIG. 4 shows an exemplary process of updating a microservice.

An update flow 400 for the same edge device is shown in FIG. 4 in actions A10-A16. In action A10, the edge device is running a microservice 402, which may include an analytics artifact and an UI artifact similar to FIG. 1. In action A12, to start the update, one or more tested artifacts are pulled from an artifactory or other storage and are stored on the device with proper version information. A database entity may be created in association to a shared database. Connections with a separate measurement database may be not activated. In action A14, the new microservice version 404 is started, e.g. by starting the one or more updated artifacts. The new version 404 may be executed in its own runtime environment, without interfering with the older version 402. Both versions can run in parallel and results are observable by operators to determine if the new service is providing desirable results, e.g. more details or higher accuracy. In action A16, the old version 402 may be stopped and associated artifacts may be removed. The analytics data produced by the old version may be kept, e.g. at least till they are archived by external devices. The data produced during parallel running period may be preserved, e.g. in the shared database, for application diagnostics when necessary.

Figure 5:
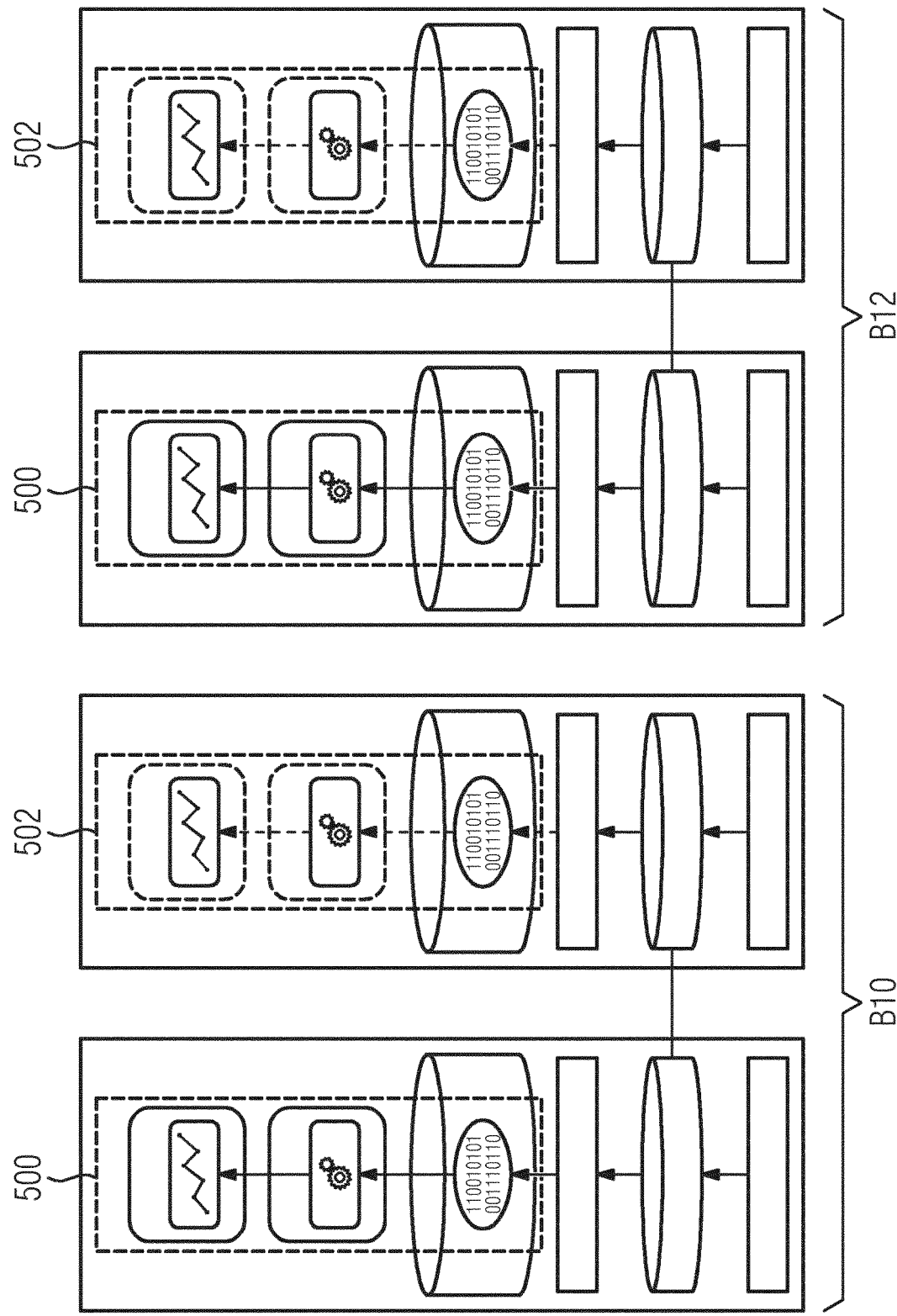
FIGS. 5-6 show another exemplary process of updating a microservice.
Figure 6:
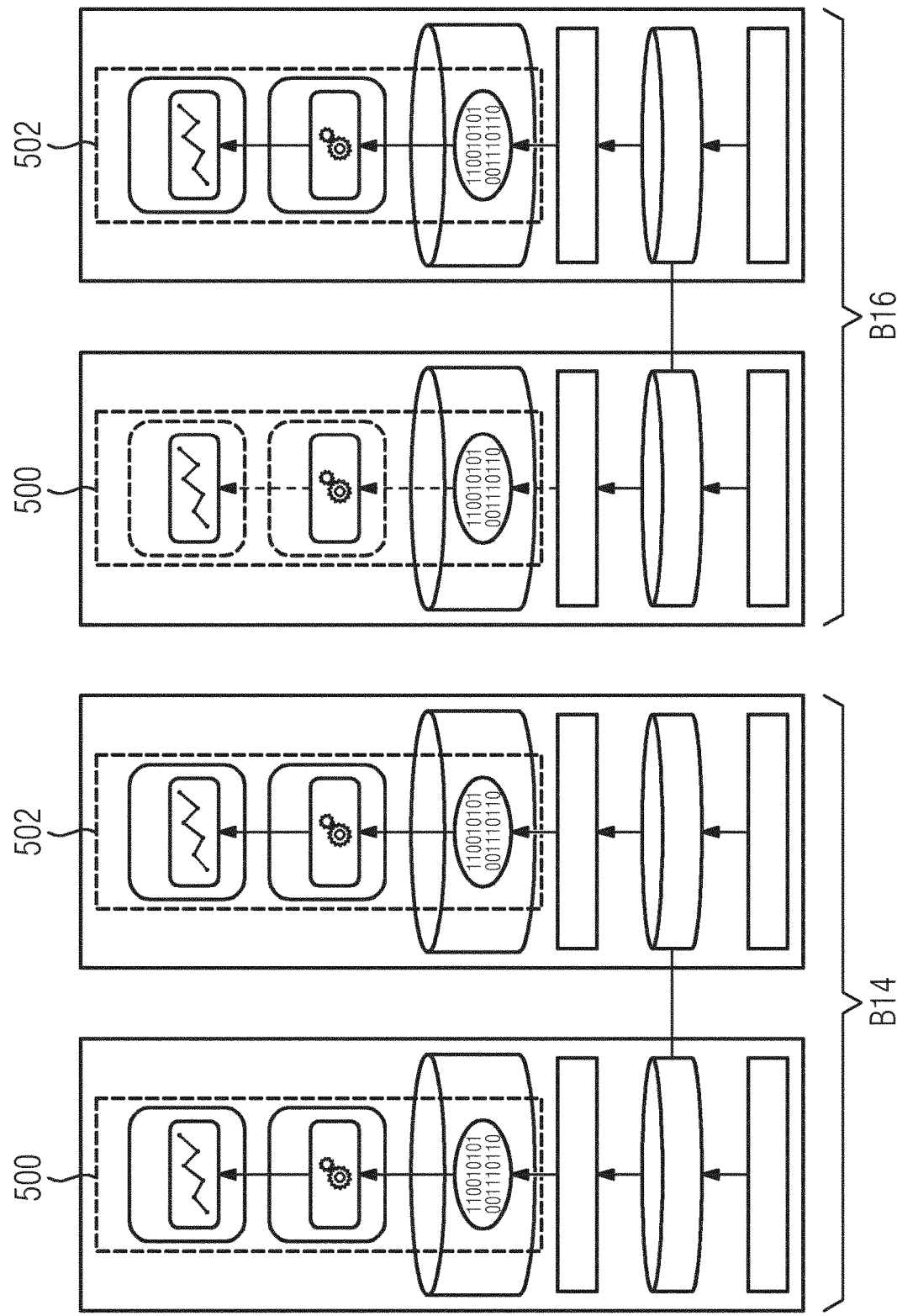

Update with a standby device is shown in FIGS. 5, 6 and 7. It is common practice to deploy a standby edge device 502, also referred to as standby device, in highly reliable production environments.

In normal operations, the standby device 502 would backup measurement data of the main edge device 500, and/or connected production devices. When the main edge device 500, also referred to as main device 500, fails, the standby device 502 should be able to resume all the functions without loss of data. Thus, the standby edge device 502 may be in connection to the main edge device 500, and/or the one or more production devices.

In an action B10, applications like microservices on the standby device 502 are not running, but the artifacts of the same version are deployed on both devices and executed on the main edge device 500. In action B12, on the standby device 502, the microservices and/or artifacts to be updated are replaced with the new or tested versions of the artifacts. They may be directly replaced, as the application is not running, and the production device is still carrying out normal operations with the old version. In action B14, the updated artifacts or microservices on the standby device 502 are activated, e.g. as in a normal failure recovery scenario. It may be considered that all artifacts and/or microservices are activated to be executed, not only updated ones.

Both devices 500, 502 are running, with the difference that the main device 500 is still running the old version/s, and the standby device 502 the updated version/s. In action B16, the main device 500 can then be switched to standby mode, and all the microservices may be deactivated, as the standby device 502 may resume and/or provide all the normal functions of the system, and thus be considered the new main device. In action B18, artifacts of the old version are replaced by artifacts of the new version on the current standby device 500. The data produced by the old version may be preserved, e.g. on a shared database. The shared database may be shared between the devices 500, 502, or separate shared databases may be provided, which may for example be synchronized to each other.

In some embodiments, limited small-scale updates to services may be provided. Small features and bug fixes may be delivered quickly. The approaches preserve the capability of allowing industrial certification with low impact. Minimal down time when updating is required. Reliability may be ensured due to on-device testing. Automation and minimal manual efforts in the delivery process are facilitated.

Even though teachings of the present disclosure have been illustrated and explained in detail above with reference to the example embodiments, the scope of the disclosure is not to be construed as limited to the given examples. Variants or alternate combinations of features given in different embodiments may be derived by a subject matter expert without exceeding the scope of present teachings.

What is claimed is:

1. An edge device for a network, the edge device comprising:
    a connection to industrial manufacturing equipment; and
    a processor adapted to run a plurality of microservices each comprising an artifact adapted for accessing an analytics database;
    wherein the analytics database is shared between microservices;
    wherein each artifact includes analytics functions for analyzing a behavior and/or condition of the connected industrial manufacturing equipment; and
    wherein the measurement information is stored in a measurement database that is separate from the analytics database.

2. An edge device according to claim 1, further comprising a memory storing the analytics database.

3. An edge device according to claim 1, wherein an artifact includes a Key Performance Indicator associated with one of the production devices.

4. An edge device according to claim 1, further comprising a connection for a second edge device comprising a standby device.

5. An edge device according to claim 1, wherein the edge device is adapted to receive an update for a microservice and to run the update of the microservice in parallel to the microservice to be updated.

6. An edge device according to claim 5, wherein:
    the edge device is adapted to run the microservice to be updated;
    the update for the microservice is run on the second edge device connected to the edge device; and
    the second edge device is started from a standby mode for running the update.

7. An edge device according to claim 5, wherein the edge device is adapted to run the microservice to be updated in parallel with the update for the microservice.

8. An edge device according to claim 1, wherein the edge device connectable to a core network for receiving updates of microservices and/or accessing the measurement information.

9. An edge device according to claim 8, wherein the core network comprises a plurality of pipelines, each pipeline pertaining to a different microservice and/or different module of a microservice.

10. An edge device according to claim 9, wherein:
    each pipeline comprises a plurality of stages; and
    one of the plurality of stages provides an environment architecture adapted to a production architecture.

11. An edge device according to claim 9, wherein:
    each pipeline comprises a plurality of stages; and
    at least one of the stages is provided in a container.

12. An edge device according to claim 1, the edge device adapted to run different microservices and/or different modules of a microservice in different run-time environments.

13. A core network connected or connectable to an edge device, the core network comprising:
    a plurality of pipelines, each pipeline pertaining to a different microservice and/or different module of a microservice;
    the edge device comprising:
        a connection to industrial manufacturing equipment; and
        a processor adapted to run a plurality of microservices each comprising an artifact adapted for accessing an analytics database;
    wherein the analytics database is shared between microservices;
    wherein each artifact includes analytics functions for analyzing a behavior and/or condition of the connected industrial manufacturing equipment; and
    wherein the measurement information is stored in a measurement database that is separate from the analytics database.

14. A core network according to claim 13, wherein:
    each pipeline comprises a plurality of stages; and
    one of the plurality of stages provides an environment architecture adapted to a production architecture.

* * * * *